United States Patent Office 3,362,911
Patented Jan. 9, 1968

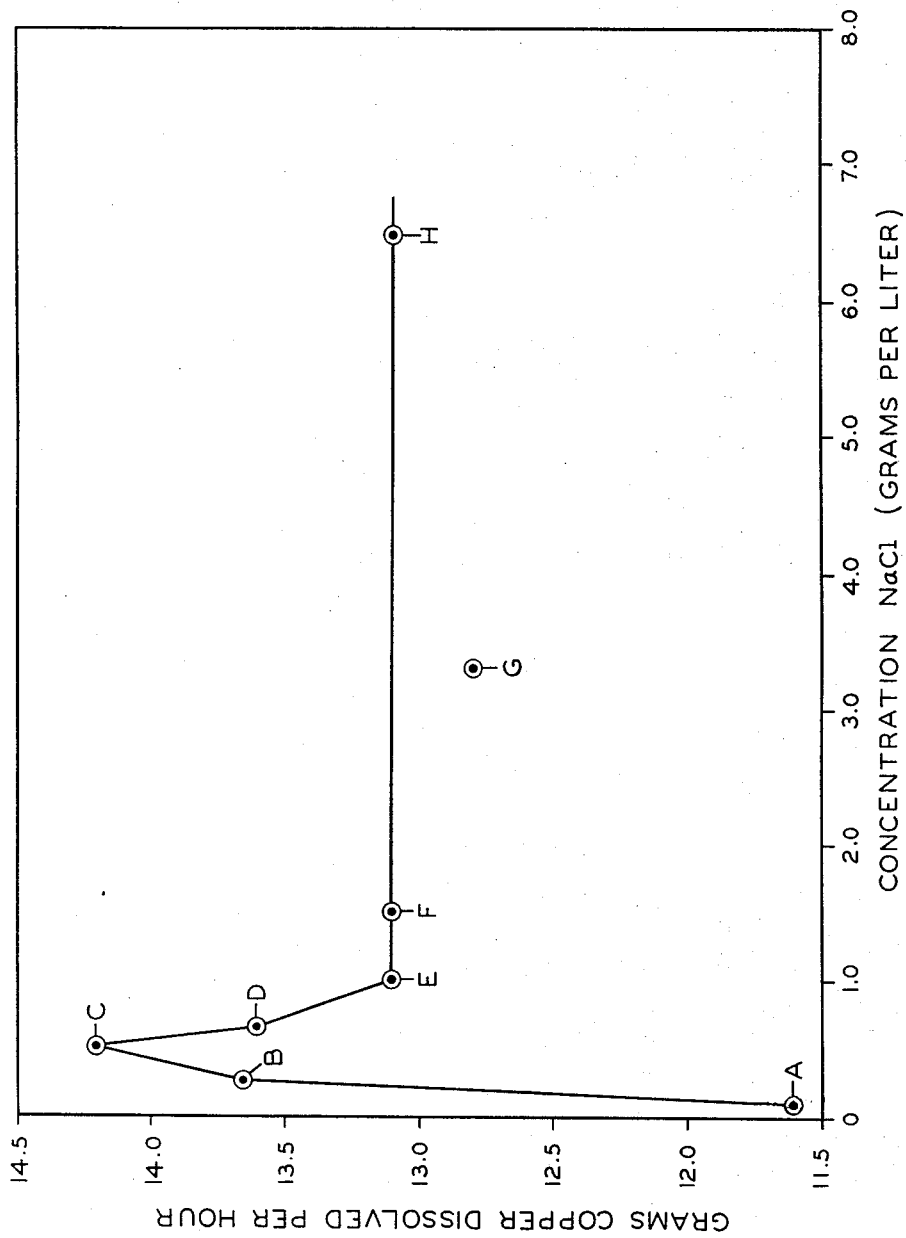

3,362,911
CHROMIC ACID-SULFURIC ACID SOLUTIONS CONTAINING CHLORIDE CATALYST FOR DISSOLVING METALS
Robert D. Byers, Onondaga, and John G. Poor, Otisco, N.Y., assignors to Allied Chemical Corporation, New York, N.Y., a corporation of New York
Filed Oct. 21, 1965, Ser. No. 499,874
2 Claims. (Cl. 252—79.2)

This invention relates to aqueous chromic acid-sulfuric acid solutions, and more particularly to new and improved chromic acid-sulfuric acid solutions adapted to dissolve metals at high rates.

Dilute aqueous solutions containing chromic and sulfuric acids are well known to be useful for treating or dissolving metals and their oxides in a variety of applications such as pickling, chemical polishing, bright dipping, chemical milling, and etching. In such applications the rate of dissolution of the metal is an important factor in the efficiency of the solution. Hence, it can be appreciated that even a minor improvement of 5–10% in dissolution rate represents a significant increase in the amount of metal dissolved in a given time period and correspondingly a substantial saving in cost of operation. Overall, the art relating to the dissolution of metals with chromic acid-sulfuric acid solutions has advanced to the stage where high dissolution rates make further improvements less common and more difficult to realize.

An object of the present invention is to provide a new and improved chromic acid-sulfuric acid solution for treating of metals.

Another object of the invention is to provide a chromic acid-sulfuric acid solution for treating of metals at high rates.

A further object of the invention is to provide a chromic acid-sulfuric acid solution for controlled dissolution of metals at an improved and faster rate.

Other objects and advantages will be evident from the following description of the invention.

In accordance with the invention it has been found that the rate of metal dissolution by chromic acid-sulfuric acid solutions is substantially increased by incorporation therein of chloride ion in a specifically limited small amount between about 0.2 to 0.9 gram per liter expressed as sodium chloride. As illustrated by FIGURE 1 of the accompanying drawing, the addition of such small amounts of chloride ion within the narrow critical range of 0.2 to 0.9 gram per liter results in a marked increase in dissolution rate over solutions containing either lesser or greater amount of chloride ion. Quality of the treated metal surface is also substantially improved by the action of the chloride catalyzed solutions of the invention.

In carrying out the present invention it is not necessary to add the chloride to the chromic acid-sulfuric acid solution in any specific form. Generally, any soluble or partially soluble chloride salt may be employed so long as the amount thereof furnishes free chloride ion within the critical range between 0.2 to 0.9 gram per liter, preferably 0.3 to 0.8 gram per liter, expressed as sodium chloride and based on the total aqueous solution. The highly water soluble chloride salts such as the alkali metal chlorides are the preferred vehicles for introducing the chloride additive. Ferric chloride is also very suitable. The more preferred vehicle is sodium chloride which is most practical from a solubility and cost standpoint.

Preparation of the chromic acid-sulfuric acid solutions of the invention involves no special procedures and the reactants and additives may be simply dissolved in water at any convenient temperature such as room temperature. As is well known, the chromic acid component referred to in identifying the chromic acid-sulfuric acid solutions is essentially a source of hexavalent chromium and may be incorporated in the solutions in various forms supplying or yielding the hexavalent chromium. Hence, the chromic acid may be introduced in its normally solid anhydrous form as chromium trioxide ($CrO_3$) which, in accordance with customary and accepted practice, is the basis on which concentrations of chromic acid herein referred to are expressed. The chromic acid component may be also introduced as a water soluble metal chromate such as sodium dichromate which in the presence of sulfuric acid is equivalent to 2 moles of chromic acid. Generally, the alkali metal dichromates are the preferred form of introducing the chromic acid because of availability at substantially less cost than chromium trioxide. The more preferred vehicle is the sodium dichromate. Other soluble dichromates may be used including ammonium dichromate which in solutions not containing catalyst is less effective but rendered at least substantially equivalent to sodium dichromate in the presence of the chloride catalyst.

The present invention is generally applicable to chromic acid-sulfuric acid solutions of the type suitable for treating or dissolving metals. Such solutions may have widely varying concentrations of chromic acid and sulfuric acid and contain such acids in widely varying proportions depending largely on the particular application or purpose of treatment. Generally, the dissolution rate, capacity and surface finish obtained from any given solution will vary depending upon the concentration and proportions of the acids, and such variables in turn are adjusted to give the more desired set of conditions for the particular application, as is known. The present invention is advantageous in beneficially improving the chromic acid-sulfuric acid solution of varying concentrations and proportions. In chemical milling, etching or other applications in which substantial dissolution of metal is desired and surface finish is a consideration but not controlling, the concentration of chromic acid is generally between about 70 to 170 grams per liter expressed as chromium trioxide ($CrO_3$), preferably between about 90 to 150 grams per liter. In such solutions the concentration of sulfuric acid is generally within the range of about 150 to 400 grams per liter, more usually between about 200 to 350 grams per liter. In the solutions adapted for substantial metal dissolution at high rates the weight ratio of chromic acid to sulfuric acid is generally between about 1:1.6 to 1:3.7 with best results obtained in those solutions in which the ratio of chromic acid to sulfuric acid is between about 1:1.8 to 1:3.2. Solutions containing lower or reduced concentrations of the acids exhibit high initial dissolution rates and high capacity but somewhat less quality surface finishes. Increasing the concentration of the acids, particularly while effecting a decrease in the ratio of chromic acid to sulfuric acid, results in solutions which have slow dissolution rates and yield poor surface quality when prepared without addition of chloride ions. Upon addition of the chloride catalyst to these solutions not only are the dissolution rates markedly improved but the treated surfaces are very smooth and brightened to a high degree.

The procedure and conditions for carrying out the present invention may be as conventionally employed with chromic acid-sulfuric acid solutions. Generally, the metal or workpiece is immersed in the solution and the treatment carried out with agitation of the solution or workpiece. Spraying the solution on the workpiece is also a known procedure for effecting dissolution of metals. Solution temperatures may vary over a fairly wide range. Generally, the rate of dissolution increases with increasing solution temperature. In etching and other applications where dissolution rates are of primary importance the operating solution temperatures are generally within the range of about 35–80° C., preferably 40–65° C.

A number of metals are well known to be subject to treatment and dissolution by chromic acid-sulfuric acid solutions. Specific examples of such metals include copper, magnesium, zinc and alloys thereof. Brass is an example of an alloy commonly treated with the solutions. A particular advantage of the invention is that the chloride catalyst solutions are highly effective in dissolving relatively pure electrodeposited copper and are further useful in etching of such copper as in manufacture of printed circuit boards.

The following examples illustrate the practice and advantages of the present invention.

In the following examples copper specimens are treated with various chromic acid-sulfuric acid solutions and the dissolution rate recorded by determining the weight loss of the specimen over a given period of time. The copper specimens employed were tubular specimens having electrolytic copper applied over a hard drawn, Type L copper tubing. The copper tubing was copper plated in a conventional fluoborate bath having a pH of 0.8–1.7 and containing copper fluoborate, $Cu(BF_4)_2$, in an amount of 225 grams per liter. The plating was carried out at about room temperature and at 20 a.s.f. The copper deposited on the tubing was 25–30 mils in thickness. The dissolution characteristics of such electrodeposited copper are similar to those of the copper typically employed in etched printed circuit boards. The specimens had an outside diameter measuring about 1⅛ inches and length of 2 inches. Each specimen was supported during dissolution by clamping a circular plastic flange over the open ends of the tube so that only the electrodeposited copper was subjected to the bath. Each specimen was immersed in a 500 ml. capacity tall form beaker containing 400 ml. of the solution. The specimen was totally immersed in the solution and agitated through a reciprocating stroke of 1½ inches at a rate of 36 cycles per minute. The specimens were dissolved at a temperature at 120° F. which was maintained by immersing the beaker in a water bath. All runs were run in duplicate and the results given in the examples represent the average dissolution rates obtained. Finish of the treated surface is of interest in many applications and is evaluated in the following examples according to an arbitrary rating system in which a rating of 0 indicates a surface of maximum roughness, a rating of 1 indicates a surface which is rough with some tendency toward smoothing, a rating of 2 indicates a surface which is still somewhat rough and/or badly discolored, a rating of 3 indicates a surface which is almost smooth and/or only somewhat discolored, a rating of 4 indicates a surface which is smooth but dull, and a rating of 5 indicates a surface which is smooth and bright.

Examples 1–8

A series of chromic acid-sulfuric acid solutions were prepared by dissolving in water 190 grams per liter of sodium dichromate dihydrate and 290 grams per liter of sulfuric acid. The solutions are varied in sodium chloride content between 0 to 6.5 grams per liter. The sodium chloride content of each of the solutions and dissolution rate obtained for such solutions are given below in Table I and shown in the accompanying drawing.

TABLE I

| Solution | NaCl Conc., grams/liter | Etch Rate, grams/first hour |
|---|---|---|
| Control | None | 9.0 |
| A | 0.1 | 11.6 |
| B | 0.25 | 13.65 |
| C | 0.5 | 14.2 |
| D | 0.75 | 13.6 |
| E | 1.0 | 13.1 |
| F | 1.5 | 13.1 |
| G | 3.3 | 12.8 |
| H | 6.5 | 13.1 |

As shown by Table I, the solution of sodium dichromate and sulfuric acid containing no additive has a dissolution rate of 9.0 grams per hour. As shown by Table I and the accompanying drawing, the solutions containing 1 or more grams per liter of sodium chloride exhibited a fairly constant dissolution rate not exceeding about 13.1 grams per hour. The solution containing 0.1 gram per liter of sodium chloride exhibits a rate of only 11.6 but upon increase of the sodium chloride content to 0.25 gram per liter there is found to be a marked increase in dissolution rate to 13.65 grams per liter. Similarly, the other solutions containing more than 0.2 and less than 1.0 gram per liter of sodium chloride show an unexpectedly high dissolution rate with the solution containing 0.75 gram per liter of sodium chloride exhibiting a high rate of 13.6 with an optimum reached at a sodium chloride concentration of about 0.5 gram per liter where the dissolution rate rises to a high 14.2 grams per hour. The control solution containing no chloride gave a surface having a finish rating of 0. Solution A gave a surface having a finish rating of 1 plus. The solutions B–H, inclusive, gave surfaces having a finish rating of 4.

Example 9

A solution the same as solution C, above, was prepared and contained 190 grams per liter of sodium dichromate dihydrate and 290 grams per liter of sulfuric acid along with 0.5 gram per liter of sodium chloride. The solution etched 14.2 grams of copper during the first hour and an additional 8.1 grams of copper during the second hour for a high total of 22.3 grams over a 2 hour period. The treated surface had a finish rating of 4.

Example 10

Chromic acid-sulfuric acid solutions containing increased amounts of sulfuric acid over the preceding examples were prepared by dissolving in water 190 grams per liter sodium dichromate dihydrate and 435 grams per liter sulfuric acid. A control solution containing no additive exhibited a slow dissolution rate of 3.4 grams during the first hour to a total of only 7.7 grams after two hours and gave a surface having a finish rating of 0. The same solution containing only 0.5 gram per liter of sodium chloride showed a markedly improved dissolution rate of 9.8 grams during the first hour and dissolved a total of 17.2 grams over a two hour period. Of special interest was the quality of the surface which had a finish rating of 5 plus demonstrating the utility of the solutions in brightening or chemical polishing applications.

Example 11

Additional chromic acid-sulfuric acid solutions were prepared to show the high beneficial effect of the incorporation of limited amounts of sodium chloride in chromic acid-sulfuric acid solutions prepared with an ammonium-dichromate salt instead of sodium dichromate. Each solution contained 160 grams per liter of ammonium dichromate and 290 grams per liter of sulfuric acid. A control solution containing no additive exhibited a dissolution rate of only 4.1 grams per hour. The solution modified only by the addition of 0.5 gram per liter of sodium chloride showed a remarkably improved and high dissolution rate of 14.5 grams per hour. Continued dissolution with the solution containing the sodium chloride also showed the dissolution of an additional 8.5 grams during the second hour of etching for a total of 23 grams over a 2 hour period. The solution used as a control in this example gave a surface having a finish rating of 0 while the solution containing the chloride ion gave a surface rating of 4.

Although certain preferred embodiments of the invention have been disclosed for purpose of illustration, it will be evident that various changes and modifications may be made therein without departing from the scope and spirit of the invention,

We claim:
1. An aqueous solution for dissolution of copper consisting essentially of 70 to 170 grams per liter of chromic acid, 150 to 400 grams per liter sulfuric acid and having incorporated therein chloride ion in a concentration between 0.2 to 0.9 gram per liter expressed as sodium chloride.
2. In a method for increasing the rate of the dissolution of copper which comprises contacting said metal with an aqueous solution containing 70 to 170 grams per liter chromic oxide and 150 to 400 grams per liter sulfuric acid at a temperature within the range of 35° to 80° C., the improvement comprising incorporating in said aqueous solution chloride ions in a concentration between 0.2 to 0.9 gram per liter expressed as sodium chloride.

References Cited

UNITED STATES PATENTS

| | | | |
|---|---|---|---|
| 2,186,579 | 1/1940 | Dubpernell et al. | 252—79.2 X |
| 2,415,724 | 2/1947 | Beall | 252—79.2 X |
| 2,982,625 | 5/1961 | Saubestre | 252—79.2 |

LEON D. ROSDOL, *Primary Examiner.*

S. E. DARDEN, *Assistant Examiner.*